(12) United States Patent
Warbington et al.

(10) Patent No.: US 9,169,131 B1
(45) Date of Patent: Oct. 27, 2015

(54) SYSTEM AND PROCESS FOR REMOVING TOTAL ORGANIC CARBONS FROM A BRINE WASTE STREAM

(75) Inventors: R. Keith Warbington, Pinehurst, NC (US); Jason Yarborough, Laurinburg, NC (US)

(73) Assignee: Trinity Manufacturing, Inc., Hamlet, NC (US)

( * ) Notice: Subject to any disclaimer, the term of this patent is extended or adjusted under 35 U.S.C. 154(b) by 496 days.

(21) Appl. No.: 13/066,683

(22) Filed: Apr. 21, 2011

Related U.S. Application Data

(60) Provisional application No. 61/342,946, filed on Apr. 21, 2010.

(51) Int. Cl.
*B01D 3/34* (2006.01)
*B01D 3/38* (2006.01)
*C02F 1/04* (2006.01)
*C02F 1/20* (2006.01)
*C02F 1/66* (2006.01)
*B01D 35/06* (2006.01)
*B01D 1/14* (2006.01)
*C02F 9/00* (2006.01)
*B01D 36/00* (2006.01)
*B01D 46/42* (2006.01)

(52) U.S. Cl.
CPC ... *C02F 1/04* (2013.01); *B01D 3/34* (2013.01); *B01D 3/38* (2013.01); *B01D 35/06* (2013.01); *C02F 1/20* (2013.01); *C02F 1/66* (2013.01); *B01D 1/14* (2013.01); *B01D 36/00* (2013.01); *B01D 46/4245* (2013.01); *C02F 9/00* (2013.01)

(58) Field of Classification Search
CPC ............ B01D 1/14; B01D 3/02; B01D 3/143; B01D 3/148; B01D 3/38; B01D 21/0009; B01D 35/06; B01D 36/00; B01D 36/001–36/003; B01D 36/008; B01D 46/0078; B01D 46/4245; B01D 46/543; B01D 53/00; B01D 53/002; B01D 53/005; C02F 1/04; C02F 1/048; C02F 1/20; C02F 1/58; C02F 1/66; C02F 1/72; C02F 9/00; C02F 2103/08; C02F 1/4604

See application file for complete search history.

(56) References Cited

U.S. PATENT DOCUMENTS

| | | | | |
|---|---|---|---|---|
| 3,649,534 | A * | 3/1972 | Schotte | 210/761 |
| 3,664,951 | A * | 5/1972 | Armstrong | 210/707 |
| 3,984,311 | A * | 10/1976 | Diesen et al. | 210/753 |
| 4,415,460 | A * | 11/1983 | Suciu et al. | 210/754 |
| 4,539,216 | A * | 9/1985 | Tse | 426/597 |
| 5,205,906 | A * | 4/1993 | Grutsch et al. | 159/47.3 |
| 6,340,736 | B1 * | 1/2002 | Coenen et al. | 528/196 |
| 7,077,201 | B2 * | 7/2006 | Heins | 166/266 |
| 8,669,396 | B2 * | 3/2014 | Choi et al. | 562/554 |
| 2005/0115901 | A1 * | 6/2005 | Heuser et al. | 210/639 |
| 2008/0053836 | A1 * | 3/2008 | Bulan et al. | 205/338 |
| 2009/0173636 | A1 * | 7/2009 | Ooms et al. | 205/439 |
| 2010/0206744 | A1 * | 8/2010 | Pereira et al. | 205/687 |

* cited by examiner

*Primary Examiner* — Virginia Monaharan
(74) *Attorney, Agent, or Firm* — William E. Noonan

(57) ABSTRACT

A process for removing organic compounds from a brine solution permits processing of that solution in a chlor-alkali electrochemical cell. A brine solution containing a mixture of nonvolatile organic compounds is introduced into a tank with a selected volume of acid and is heated to boiling. Nonvolatile organic compounds in the solution are decomposed such that they become volatile compounds, which are removed by distillation from the tank or by additional subsequent steam distillation. The resulting brine solution has a final total organic compound (TOC) level sufficiently low to render its suitable for use in a membrane, diaphragm or other type of chlor-alkali electrochemical cell.

19 Claims, 1 Drawing Sheet

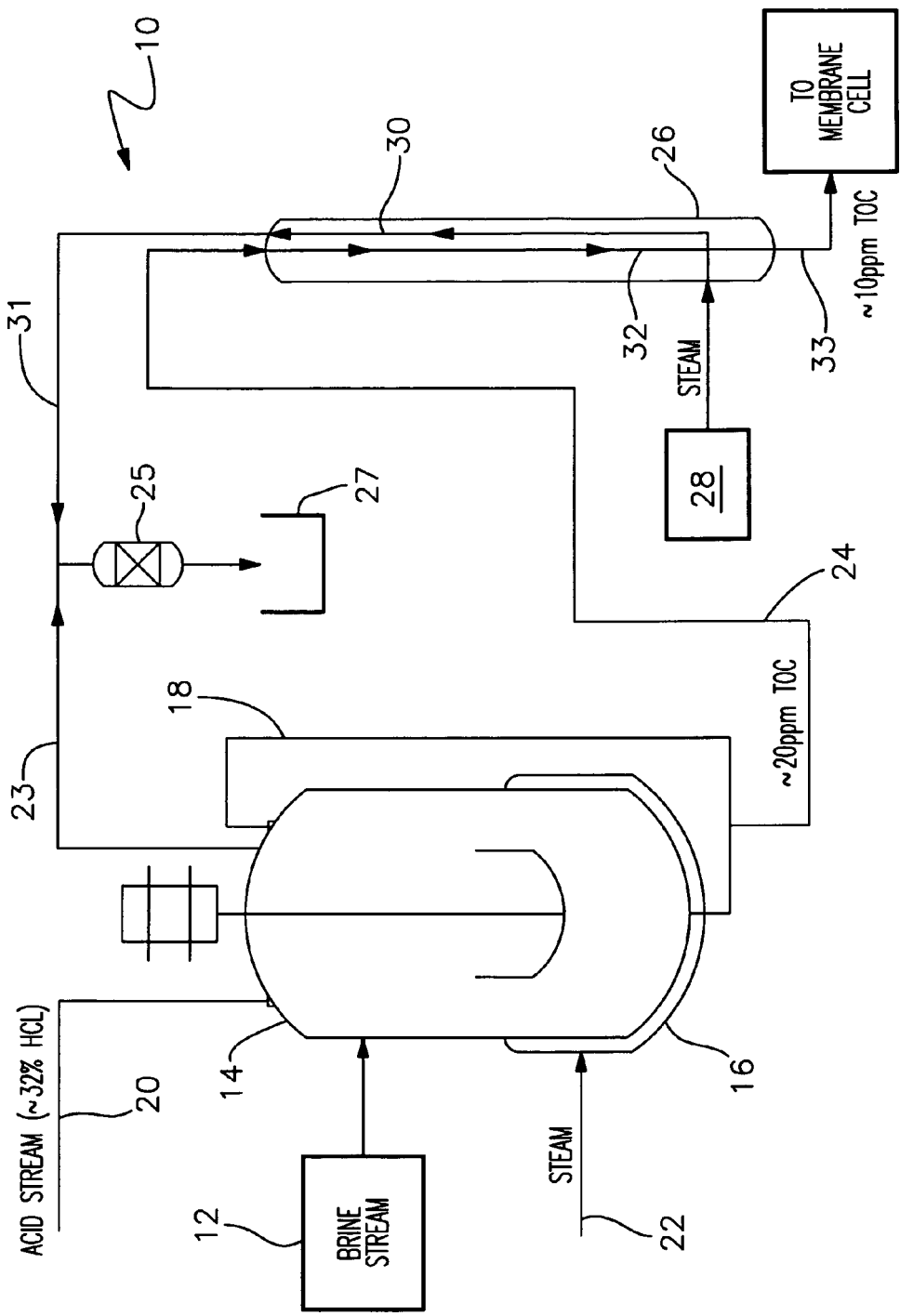

SYSTEM AND PROCESS FOR REMOVING TOTAL ORGANIC CARBONS FROM A BRINE WASTE STREAM

RELATED APPLICATION

This application claims the benefit of U.S. Provisional Patent Application Ser. No. 61/342,946 filed Apr. 21, 2010.

FIELD OF THE INVENTION

This invention relates to a system and process for reducing the level of total organic carbon (TOC) in a brine waste stream so that the stream may be effectively recycled to recover sodium chloride (NaCl).

BACKGROUND OF THE INVENTION

Chloropicrin is commonly employed as an agricultural fumigant and in other applications. Conventional methods of chloropicrin production are inefficient, wasteful and unduly expensive. The production process generates a brine waste stream featuring a concentration of approximately 25% sodium chloride and a total organic carbon level (TOC) of approximately 100 ppm. Not only must the brine waste stream be disposed of, a fresh supply of sodium chloride must be acquired and used for continued manufacture of chloropicrin.

Ideally, it would be desirable to recover sodium chloride from the brine waste stream in order to use it for the continued production of chloropicrin. However, the presence of aliphatic hydrocarbons in the waste stream has, until now, prevented the successful recovery of NaCl from the brine. The high level of such compounds present in the stream interferes with standard membrane and diaphragm-type chlor-alkali electrolytic cells and does not allow such cells to successfully process sodium chloride in the brine solution.

SUMMARY OF THE INVENTION

It is therefore an object of the present invention to provide a system and method for efficiently removing total organic carbons (TOC's) from a brine waste stream so that sodium chloride may be effectively recovered from the stream.

It is a further object of this invention to provide a TOC removal process that enables sodium chloride to be efficiently recovered from the brine waste stream produced during the manufacture of chloropicrin so that such sodium chloride may be efficiently and cost effectively recycled and used for further chloropicrin production.

It is a further object of this invention to provide a method for removing TOC's from a brine waste stream produced during the manufacture of chloropicrin, which greatly reduces the costs associated with disposing of the waste stream and acquiring a fresh supply of raw material needed for additional chloropicrin manufacture.

It is a further object of this invention to provide a process that significantly reduces the effort and expense of treating a brine waste stream produced during the manufacture of chloropicrin and other chemicals.

This invention results from a realization that chloropicrin can be produced much more efficiently and cost effectively by reducing the TOC level of the brine waste stream generated by the production process so that the stream can be recycled to produce a fresh supply of sodium chloride for use in continued chloropicrin production. Such a technique significantly reduces the cost associated with treating and disposing of the brine waste stream. It also yields an efficient, recycled source of raw materials for additional chloropicrin production.

This invention features a process for removing total organic carbons (TOC's) from a brine waste stream. A brine waste solution from a chemical (e.g. chloropicrin) production process is introduced to a tank along with an acid to reduce the pH level of the brine solution. The brine is then heated and water is removed by boiling until the brine reaches a select boiling temperature and concentration. This produces a concentrated, low pH salt solution within the tank. The combination of acid and heat in the concentrated solution causes oxidation, thermal decomposition and subsequent volatilization of the TOC's in the brine solution and, as a result, a reduction of the TOC level by approximately 80%. The thus treated and concentrated solution of sodium chloride is then transferred to a distillation apparatus, in which steam is used to separate an additional amount of TOC's from the brine solution. The separated TOC's are condensed for disposal. The resultant purified brine solution is directed from the distillation apparatus to an electrochemical cell to produce chlorine and caustic, which are raw materials for the subsequent manufacture of chloropicrin or other chlor-alkali products.

In a preferred embodiment, the tank includes a jacketed agitator reactor that is heated by adding steam to a jacket of the tank. Hydrochloric acid (HCl) may be employed in the acid stream and preferably the pH of the introduced brine solution is reduced by the acid to a value of not greater and preferably less than 2. The brine and the acid are added to the tank at a ratio of about 19:1. Steam may be applied to the shell of the tank (or added to the jacket) to maintain the temperature in the tank in a range of 220°-225° F. for a period of time sufficient to reduce the original volume of liquid in the tank by approximately 1-5%. Alternatively, the tank may include a recycle loop that allows the brine solution to be recycled through the tank and heated. As the result of decomposition, oxidation, and volatilization, TOC levels in the brine solution in the tank will be reduced to a level of approximately 20 ppm.

The distillation apparatus may include a distillation column used for steam distillation of the brine. Such distillation will remove additional volatile organic carbons (VOC's) and may reduce the level of TOC's in the brine to 10 ppm or less. A solution treated in this manner can then be processed in a membrane or other type of chlor-alkali cell to reclaim sodium chloride for use in the production of chlorine, caustic and other chlor-alkali products including chloropicrin.

DETAILED DESCRIPTION OF PREFERRED EMBODIMENTS

Other objects, features and advantages will occur from the following description of a preferred embodiment and the accompanying drawing, in which:

FIG. 1 is a schematic view of a system and process for removing TOC's from a brine waste stream in accordance with this invention.

There is shown in FIG. 1 a system 10 for removing total organic carbons (TOC's) from a brine waste stream of the type normally produced during the manufacture of a chemical such as chloropicrin. It should be understood that the present invention is particularly effective for treating brine waste generated during the chloropicrin production process. However, the system and process of this invention may also be used effectively for recovering sodium chloride from other types of brine solutions and waste streams. A brine waste stream produced during the manufacture of chloropicrin typically features a sodium chloride (NaCl) concentration of approximately of 23% wt/wt. This product typically features a non-volatile TOC level of approximately 100 ppm. These amounts may vary somewhat within the scope of this invention.

Brine stream 12 is introduced into a reactor tank 14, which comprises an agitated tank with a heat jacket 16. Various inlet and outlet pipes or conduits are interconnected to tank 14 in a conventional industry manner. A pipeline or conduit 18 is also connected to tank 14 for recirculating the liquid in tank 14 using a pump as is typically used in the industry. The pump loop may optionally include equipment for introducing additional heat to the tank. This loop allows brine solution within tank 14 to be recycled through the tank in a manner that is described more fully below.

An acid stream 20 comprising approximately a 32% solution of hydrochloric acid (HCl) is also introduced into tank 14. The brine stream and acid stream are added to the tank in a ratio of at least 19:1 and not greater than 99:1. As a result, the pH of the brine solution within tank 14 is lowered to no more than and preferably less than 2.

Steam 22 is introduced to the shell or jacket 16 of tank 14 to boil the brine and acid solution. Steam is added to maintain the interior of the tank within a temperature range of 220°-225° F. for a time sufficient to reduce the original volume of liquid within the tank by approximately 1-5%. The hot concentrated brine reacts with the acid in the tank to decompose and oxidize TOC's in the solution. Such decomposed TOC's are converted to VOC's (volatile organic compounds) that are removed from tank 14 through a vent line 23 or at a later point in the process. VOC's extracted through the reactor vent pipe 23 are recovered in a condenser 25 and collected for waste disposal at a reservoir 27.

As previously indicated, recycle loop 18 may include a heat exchanger or other conventional equipment for heating the brine solution in tank 14 externally. In any event, the first stage brine solution in tank 14 is heated in the presence of the acid to thermally decompose, oxidize and accordingly convert TOC's in the solution into volatile organic compounds (VOC's). This reduces the TOC level in the brine solution to approximately 20 ppm.

A concentrated sodium chloride solution with the reduced TOC level of about 20 ppm is delivered from tank 14 through a line 24 to the top end of a packed distillation column 26. Live steam 28 is introduced at the bottom of the distillation column. This steam flows upwardly through and exits the top of column 26 as indicated by arrow 30. The brine introduced at the top of the column flows downwardly countercurrent to the rising steam as indicated by arrow 32. As the rising steam contacts the descending brine, TOC's are removed from the brine by the process of steam distillation. The removed TOC's are discharged from the upper end of column 26 with the steam and directed through a line 30 to condenser 25. The TOC constituents are condensed and collected for waste disposal 27. Steam 28 causes an additional 10 ppm of TOC to be removed from the concentrated brine solution by means of such steam distillation.

The brine solution exiting column 26 is approximately 25% sodium chloride, with a reduced TOC level of less than 10 ppm. Approximately 90% or more of the TOC's have thus been extracted from the solution. This product is discharged as an output stream at the lower end of column 26 as indicated by arrow 33. The treated brine is then directed to a standard membrane or other type of chlor-alkali electrolytic cell or filter. Because the vast majority of TOC's have already been removed by he foregoing process, the cell is able to successfully process the resulting brine solution and the sodium chloride in the solution. Output stream 33 may be added to an independent fresh brine source being processed by the electrolytic cell. The sodium chloride, recovered in the cell is converted to other compounds (e.g. NaOH, HCl) and/or to elemental sodium and chlorine, which can then be used for the further production of chloropicrin or for other uses.

The system and process of this invention significantly reduce the cost of chloropicrin production as well as the amount of waste typically generated during such production. The expense normally associated with treating and disposing of waste brine solution is also mitigated. This invention likewise reduces the amount of raw materials that must be acquired for the production process by returning both salt and water to the electrochemical cell. Such materials may now be recovered from the waste stream and efficiently reused. The disclosed system and process also provide significant economic and environmental benefits to the community by reducing the amount of waste salt discharged to waste water treatment facilities, which, in turn, have traditionally discharged those salts into area streams and rivers.

It should also be understood that the system and process of this invention may be used effectively to extract sodium chloride from brine waste associated with the production of chemicals other than chloropicrin. By the same token, the invention is not limited to use in recovering sodium chloride from brine waste streams produced during the manufacture of chemicals; it may also be employed to reduce TOC's and render brine solutions suitable for sodium chloride extraction in other applications and environments. In either case, the brine solution is rendered compatible with standard sodium chloride extracting cells so that salt recovery is greatly facilitated.

From the foregoing it may be seen that the apparatus of this invention provides for a system and process for reducing the level of total organic carbon (TOC) in a brine waste stream so that the stream may be effectively recycled to recover reusable sodium chloride (NaCl). While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A method for removing total organic compounds from a brine solution containing nonvolatile organic compounds to permit further processing of the brine solution by an electromechanical filter, said method consisting of:
   introducing a brine solution to a tank;
   introducing an acid to said tank to adjust and maintain the pH of the brine solution in the tank such that the pH does not exceed 2;
   boiling the brine solution in the tank at a temperature of 220° F.-225° F. in the presence of the acid to concentrate the brine solution in said tank and cause said brine solution to react with said acid such that a portion of the nonvolatile organic compounds in the brine solution thermally decompose, oxidize and convert to volatile organic compounds;

recovering converted volatile organic compounds from the brine solution in the tank to reduce the amount of total organic compounds in the brine solution;

removing the brine solution from the tank after the total organic compounds in the brine solution have been reduced;

distilling the brine solution removed from the tank with steam to convert at least some of the nonvolatile organic compounds remaining in the brine solution to additional volatile organic compounds;

recovering the additional volatile organic compounds from the brine solution after the brine solution has been distilled to further reduce the amount of total organic compounds in the brine solution;

and processing the distilled brine solution with the electromechanical filter after the additional volatile organic compounds are recovered from the brine solution.

2. The method of claim 1 in which the acid includes hydrochloric acid.

3. The method of claim 1 in which the brine solution and the acid are added to the tank at a ratio of at least 19:1 and not more than 99:1.

4. The method of claim 1 further consisting of the step of recirculating the brine solution through the tank after the brine solution has been boiled and prior to distilling the brine solution.

5. The method of claim 1 in which the volatile organic carbons are recovered from the brine solution in the tank, delivered to a condenser, and collected for waste disposal therefrom.

6. The method of claim 1 in which the additional volatile organic carbons are recovered from the distilled brine solution, delivered to a condenser, and collected for waste disposal therefrom.

7. The method of claim 1 in which said brine solution is collected from a chloropicrin production process for introduction into the tank.

8. The method of claim 1 wherein the brine solution is maintained at a temperature of 220° F.-225° F. for sufficient time to reduce the original volume of liquid in the tank, by 1-5%.

9. A method for removing total organic compounds from a brine solution containing nonvolatile organic compounds to permit further processing of the brine solution by an electromechanical filter, said method consisting of:

introducing a brine solution to a tank;

introducing an acid to said tank to adjust and maintain the pH of the brine solution in the tank such that the pH does not exceed a predetermined level;

boiling the brine solution in the tank in the presence of the acid to concentrate the brine solution in the tank and cause the brine solution to react with the acid such that a portion of the nonvolatile organic compounds in the brine solution thermally decompose, oxidize and convert to volatile organic compounds;

recovering converted volatile organic compounds from the brine solution in the tank to reduce the amount of total organic compounds in the brine solution;

discharging from the tank an output stream consisting of the brine solution containing the reduced amount of total organic compounds in the form of nonvolatile organic compounds remaining in the brine solution;

delivering the output stream from the tank to a distillation device and distilling the output stream removed from the tank with steam to convert at least some of the nonvolatile organic compounds remaining in the brine solution of the output stream to additional volatile organic compounds;

recovering the additional volatile organic compounds from the brine solution in the output stream after the output stream has been distilled to further reduce the amount of total organic compounds remaining in the brine solution;

and processing the distilled brine solution with the electromechanical filter after the additional volatile organic compounds are recovered from the brine solution.

10. The method of claim 9 in which the acid includes hydrochloric acid.

11. The method of claim 9 in which the waste brine solution and the acid are added to the tank at a ratio of at least 19:1 and not more than 99:1.

12. The method of claim 9 in which said waste brine solution is boiled in the tank at a temperature of 220° F.-225° F.

13. The method of claim 9 further including the step of recirculating the boiled brine solution through the tank prior to distillation of the boiled brine solution.

14. The method of claim 9 wherein the brine solution is maintained at a temperature of 220° F.-225° F. for sufficient time to reduce the original volume of liquid in the tank by 1-5%.

15. The method of claim 9 wherein the brine solution is boiled for a sufficient time to reduce the original volume of liquid in the tank by 1-5%.

16. The method of claim 9 in which the pH of the brine solution is maintained at not greater than 2.

17. The method of claim 9 in which the brine solution in the tank is boiled at a temperature of 220° F.-225° F.

18. A method for removing total organic compounds from a brine solution containing nonvolatile organic compounds to prevent further processing of the brine solution by an electromechanical filter, said method consisting of:

introducing a brine solution to a tank;

introducing an acid to said tank to adjust and maintain the pH of the brine solution in the tank such that the pH does not exceed 2;

boiling the brine solution in the tank at a temperature of 220° F.-225° F. in the presence of the acid and recirculating the boiled brine solution through the tank to concentrate the brine solution in the tank and cause the brine solution to react with the acid such that a portion of the nonvolatile organic compounds in the brine solution thermally decompose, oxidize and convert to volatile organic compounds;

recovering converted volatile organic compounds from the brine solution in the tank to reduce the amount of total organic compounds in the brine solution;

removing the brine solution from the tank after the total organic compounds in the brine solution have been reduced;

distilling the brine solution removed from the tank with steam to convert at least some of the nonvolatile organic compounds remaining in the brine solution to additional organic compounds;

recovering the additional volatile organic compounds from the brine solution after the brine solution has been distilled to further reduce the amount of total organic compounds in the brine solution;

and processing the distilled brine solution with the electromechanical filter after the additional volatile organic compounds are recovered from the brine solution.

19. The method of claim 18 wherein the brine solution is maintained at a temperature of 220° F.-225° F. for sufficient time to reduce the original volume of liquid in the tank by 1-5%.

* * * * *